US008429645B2

(12) United States Patent
Draper et al.

(10) Patent No.: US 8,429,645 B2
(45) Date of Patent: Apr. 23, 2013

(54) METHOD FOR OPTIMIZING MIGRATION OF SOFTWARE APPLICATIONS TO ADDRESS NEEDS

(75) Inventors: Patrick J. Draper, Austin, TX (US); Kevin D. Galloway, Austin, TX (US); Jim Hyde, Pflugerville, TX (US); Ying Li, Beijing (CN); Liang Liu, Beijing (CN); Qian Ma, Beijing (CN); Krishna C. Ratakonda, Yorktown Heights, NY (US); Kewei Sun, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1266 days.

(21) Appl. No.: 11/838,274

(22) Filed: Aug. 14, 2007

(65) Prior Publication Data

US 2009/0049438 A1 Feb. 19, 2009

(51) Int. Cl.
*G06F 9/445* (2006.01)
(52) U.S. Cl.
USPC ............................................................ 717/177
(58) Field of Classification Search .......... 717/168–178; 707/812, 969, 704, 103
See application file for complete search history.

(56) References Cited

U.S. PATENT DOCUMENTS

| | | | | |
|---|---|---|---|---|
| 5,832,274 A * | 11/1998 | Cutler et al. | ................... | 717/171 |
| 6,016,394 A * | 1/2000 | Walker | ........................... | 717/104 |
| 6,151,608 A * | 11/2000 | Abrams | ........................ | 707/679 |
| 6,161,176 A * | 12/2000 | Hunter et al. | ..................... | 713/1 |
| 6,370,646 B1 | 4/2002 | Goodman et al. | | |
| 6,625,622 B1 * | 9/2003 | Henrickson et al. | ................... | 1/1 |
| 6,698,017 B1 | 2/2004 | Adamovits et al. | | |
| 6,701,333 B2 | 3/2004 | Suermondt et al. | | |
| 6,735,691 B1 * | 5/2004 | Capps et al. | ....................... | 713/1 |
| 6,775,673 B2 | 8/2004 | Mahalingam et al. | | |
| 6,889,376 B1 * | 5/2005 | Barritz et al. | .................. | 717/175 |
| 6,963,908 B1 * | 11/2005 | Lynch et al. | ................... | 709/220 |
| 6,964,044 B1 * | 11/2005 | Hudson et al. | ................ | 717/177 |
| 6,968,370 B2 * | 11/2005 | Wu | ............................... | 709/220 |
| 7,080,159 B2 * | 7/2006 | Chu et al. | ....................... | 709/246 |
| 7,117,486 B2 * | 10/2006 | Wong et al. | .................... | 717/141 |
| 7,134,122 B1 * | 11/2006 | Sero et al. | ...................... | 717/177 |
| 7,191,188 B2 * | 3/2007 | Uluakar et al. | ............... | 707/796 |
| 7,346,766 B2 * | 3/2008 | Mackin et al. | ................ | 713/100 |
| 7,765,181 B2 * | 7/2010 | Thomas et al. | ............... | 709/221 |
| 7,856,631 B2 * | 12/2010 | Brodkorb et al. | ............. | 717/177 |
| 7,861,239 B2 * | 12/2010 | Mayfield et al. | .............. | 717/170 |
| 7,870,169 B2 * | 1/2011 | Draper et al. | .................. | 707/812 |
| 8,006,242 B2 * | 8/2011 | Block et al. | ................... | 717/175 |
| 8,020,163 B2 * | 9/2011 | Nollet et al. | .................... | 718/104 |
| 8,032,617 B2 * | 10/2011 | Bendapudi et al. | ........... | 709/221 |
| 2002/0032908 A1 * | 3/2002 | Booth | ............................. | 725/86 |
| 2003/0200274 A1 * | 10/2003 | Henrickson et al. | .......... | 709/212 |
| 2004/0068715 A1 | 4/2004 | Wong et al. | | |
| 2005/0091346 A1 * | 4/2005 | Krishnaswami et al. | ..... | 709/220 |

(Continued)

*Primary Examiner* — Don Wong
*Assistant Examiner* — Daxin Wu
(74) *Attorney, Agent, or Firm* — Anne V. Dougherty; Ryan, Mason & Lewis, LLP (57) ABSTRACT

An exemplary method (which can be computer implemented) for enhancing migration of software applications from a source system environment to a destination system environment includes the steps of translating needs into requirements for the destination system, capturing deployment and configuration of the software applications in the source system environment and the destination system environment in a centralized model, analyzing dependencies between the systems in the source and destination systems to construct a mapping between the requirements and elements of the model, and generating enhanced migration rules, based, at least in part, on the mapping.

19 Claims, 5 Drawing Sheets

U.S. PATENT DOCUMENTS

2007/0299975 A1* 12/2007 Daschakowsky et al. .... 709/228
2008/0140469 A1* 6/2008 Iqbal et al. ........................ 705/7
2009/0006493 A1* 1/2009 Draper et al. .................. 707/202
2009/0070771 A1* 3/2009 Yuyitung et al. ............... 718/105

* cited by examiner

*FIG. 1*
PRIOR ART
MANUAL MIGRATION

*FIG. 2*
PRIOR ART
MIGRATION UTILITY

METHOD FOR OPTIMIZING MIGRATION OF SOFTWARE APPLICATIONS TO ADDRESS NEEDS

CROSS-REFERENCE TO RELATED APPLICATIONS

This patent application is related to U.S. patent application Ser. No. 11/770,788 filed on Jun. 29, 2007, and entitled "Method for Enabling Traceability and Recovery from Errors during Migration of Software Applications." The disclosure of the aforementioned patent application Ser. No. 11/770,788 is expressly incorporated herein by reference in its entirety.

FIELD OF THE INVENTION

The present invention relates to the electrical, electronic and computer arts, and, more particularly, to migration of software applications.

BACKGROUND OF THE INVENTION

The increasing size and complexity of the information technology (IT) needs of enterprises force periodic upgrade of their IT infrastructures—in this context, software applications ranging from operating systems, middleware and end-user applications need to be migrated. The process associated with migration may range from simple to complex, depending on the number of elements which change during the upgrade—the most complex being a change in both the hardware and the type of operating system. Such a change typically necessitates a complete rebuilding of the middleware and end-user application stack to support the same enterprise functions on the new platform.

In many migration scenarios the move to a new system is prompted by inadequacies or performance bottlenecks in the old system. Thus, a simple provisioning and configuration of the new machines to match the capabilities of the old system will often not be sufficient. Given that the typical server consolidation project may rely heavily on virtualized and networked resources, it is not clear that over-provisioning individual systems will eventually meet the needs (such as enterprise needs) that were the driving factors behind the migration. For example, in the case of a cluster of web servers, if the performance bottleneck is created by a shared database increasing the number of servers would not lead to a significant increase in the number of transactions that can be handled in a unit time. A careful analysis of the resource sharing between virtual servers on the same hardware and physical servers sharing networked storage of peripherals would be required to obtain the right provisioning scheme.

Figure 1:
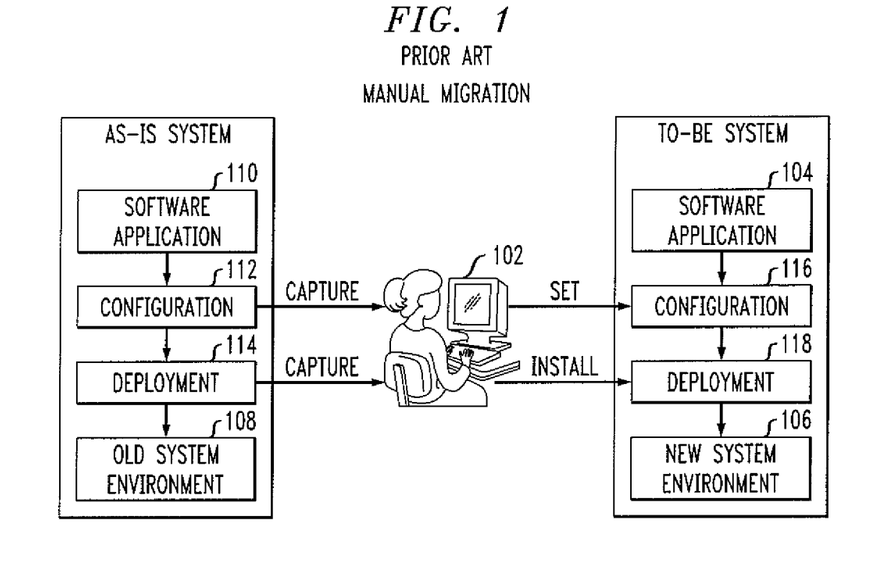
FIG. 1 illustrates a prior art manual software migration technique.
Figure 2:
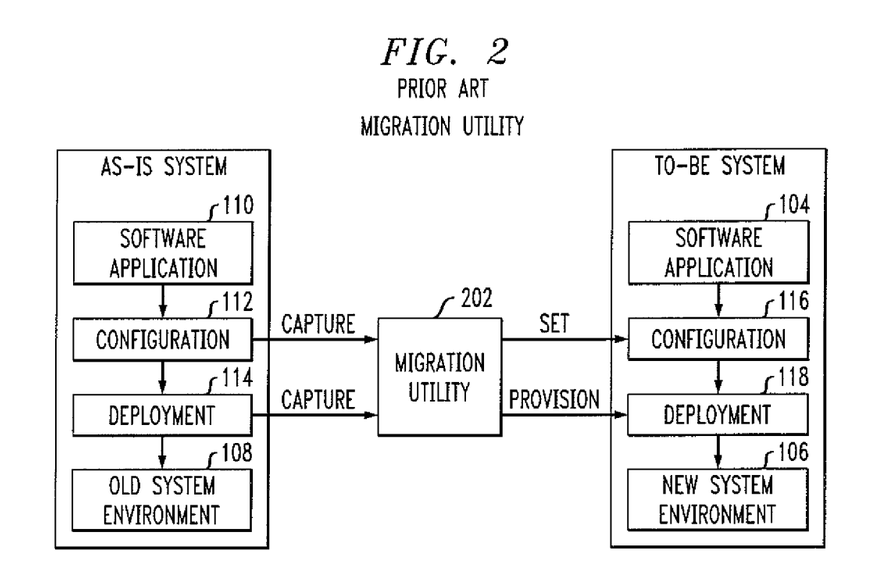
FIG. 2 illustrates a prior art technique employing a migration utility.

In the prior art, there are generally two common methods for migrating software applications from the old system environment to the new. As shown in FIG. 1, the first method of migrating software is a manual process, in which the system administrator or user 102 manually installs and configures software 104 on a new system environment 106, for example, by following instructions provided in the documentation for the software application(s) and new system environment, by inspection of the existing deployment and configuration data files on the old infrastructure 108, or other manual techniques. This method is very tedious and time consuming, prone to human error, and dependent upon the level of training and skill of the individual making the manual changes. By way of completeness, in this process, an "as-is system" has one or more software applications 110 that have been configured and deployed, as per blocks 112, 114, resulting in the old system environment 108. The configuration and deployment are captured, as indicated by the arrows In the "to-be" system, one or more software applications 104 are present, and are configured and deployed as per blocks 116, 118, to obtain the new system environment 106. The configuration and deployment 116, 118 are the result of the setting and installation by administrator or user 102, as indicated by the arrows According to the second method of migrating software applications, as shown in FIG. 2, a separate executable apparatus called a Migration Utility 202 is provided to read the specific deployment and configuration files of the software application 110 that is the migration target, as well as the resource(s) required by the software applications within the old system environment 108. Elements in FIG. 2 similar to FIG. 1 have received the same reference numeral. Utility 202 maps the deployment and configurations of software applications to new system environment 106, to generate deployment plan(s) and configuration files, and then provisions and sets software applications on the new system environment 106 based on the deployment plan and configuration files. This method has the advantage that the process can be implemented automatically, leading to improved efficiency However, this kind of method can only achieve software application execution in the new system environment via simple mapping, provisioning, and configuring of software application(s) from the old to new system environments. In the prior art it is not clear how to translate a requirement (for example, an enterprise requirement) for improved performance of a software application into specific migration provisioning decisions.

SUMMARY OF THE INVENTION

Principles of the present invention provide techniques for optimizing migration of software applications to address needs. In one aspect, an exemplary method (which can be computer implemented) for enhancing migration of software applications from a source system environment to a destination system environment includes the steps of translating needs into requirements for the destination system, capturing deployment and configuration of the software applications in the source system environment and the destination system environment in a centralized model, analyzing dependencies between the systems in the source and destination systems to construct a mapping between the requirements and elements of the model, and generating enhanced migration rules, based, at least in part, on the mapping. In some instances, the enhancing involves optimization. One significant aspect of one or more embodiments of the invention is that during the migration process, enhanced (or optimized) rules can be generated before actual migration, to address requirements, such as enterprise requirements.

One or more embodiments of the invention or elements thereof can be implemented in the form of a computer product including a computer usable medium with computer usable program code for performing the method steps indicated. Furthermore, one or more embodiments of the invention or elements thereof can be implemented in the form of an apparatus including a memory and at least one processor that is coupled to the memory and operative to perform exemplary method steps.

One significant advantage of one or more embodiments of the invention is that the decision taken to address each performance bottleneck is captured in the form of a decision rule. Thus, future analysis for potential further modifications to the infrastructure can refer to the decisions made in the past—this can help avoid recreating the same problems and also provide guidance on which solution really worked in a particular enterprise setting.

These and other features, aspects and advantages of the present invention will become apparent from the following detailed description of illustrative embodiments thereof, which is to be read in connection with the accompanying drawings.

DETAILED DESCRIPTION OF PREFERRED EMBODIMENTS

Figure 3:
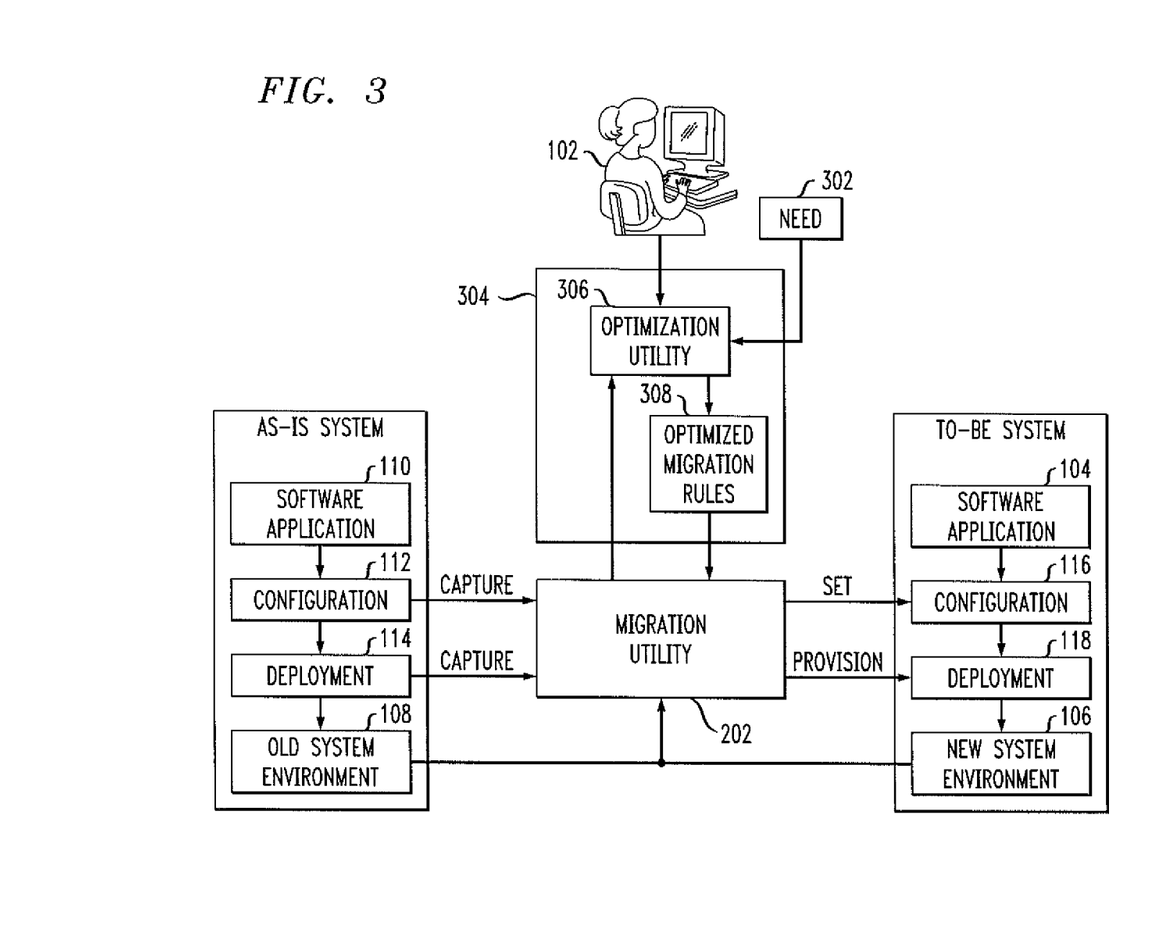
FIG. 3 illustrates an exemplary method for migration enhancement, according to an aspect of the invention.

Attention should now be given to FIG. 3. Elements therein similar to FIGS. 1 and 2 have received the same reference character. Enhancing or optimizing migration of software applications from an old system environment 108 to a new system environment 106, to address needs 302 (such as enterprise needs), according to an aspect of the invention, includes analyzing the system environment, reading and analyzing needs such as enterprise needs, and generating enhanced or optimized migration rules for migration utility 202 to execute provisioning and configuration of software applications 104. These steps are accomplished, in one or more inventive embodiments, through an entity for migration optimization 304, which can include, for example, an optimization (or enhancement) utility 306 generating enhanced (or optimized) migration rules 308. Enhanced or optimal provisioning may be advantageously addressed via careful analysis of the interdependencies between the resources as captured from the "as is" and "to be" systems in a centralized model (see 416 below). During the migration process, when the configuration parameters from the as-is system are captured, common resources can be identified through simple pattern matching. This information can be presented either graphically or textually to the administrator 102, who identifies potential bottlenecks—in this process he may use supplemental information captured from performance analysis tools, performance problems and/or outages reported by users, centralized configuration management repositories, and the like (see 406 below).

In one or more embodiments, design of the "to be" system, which modifies the simple one-to-one provisioning scheme to achieve the requirements, is captured in the form of decision rules within the migration system. Generation of at least some of these enhanced or optimized migration rules may be semi-automated—for example, migrating a printer to a newly established print server across all the servers which use that printer may be accomplished through a single rule which is created through the assistance of a graphical user interface (GUI) (see 402 below).

Figure 4:
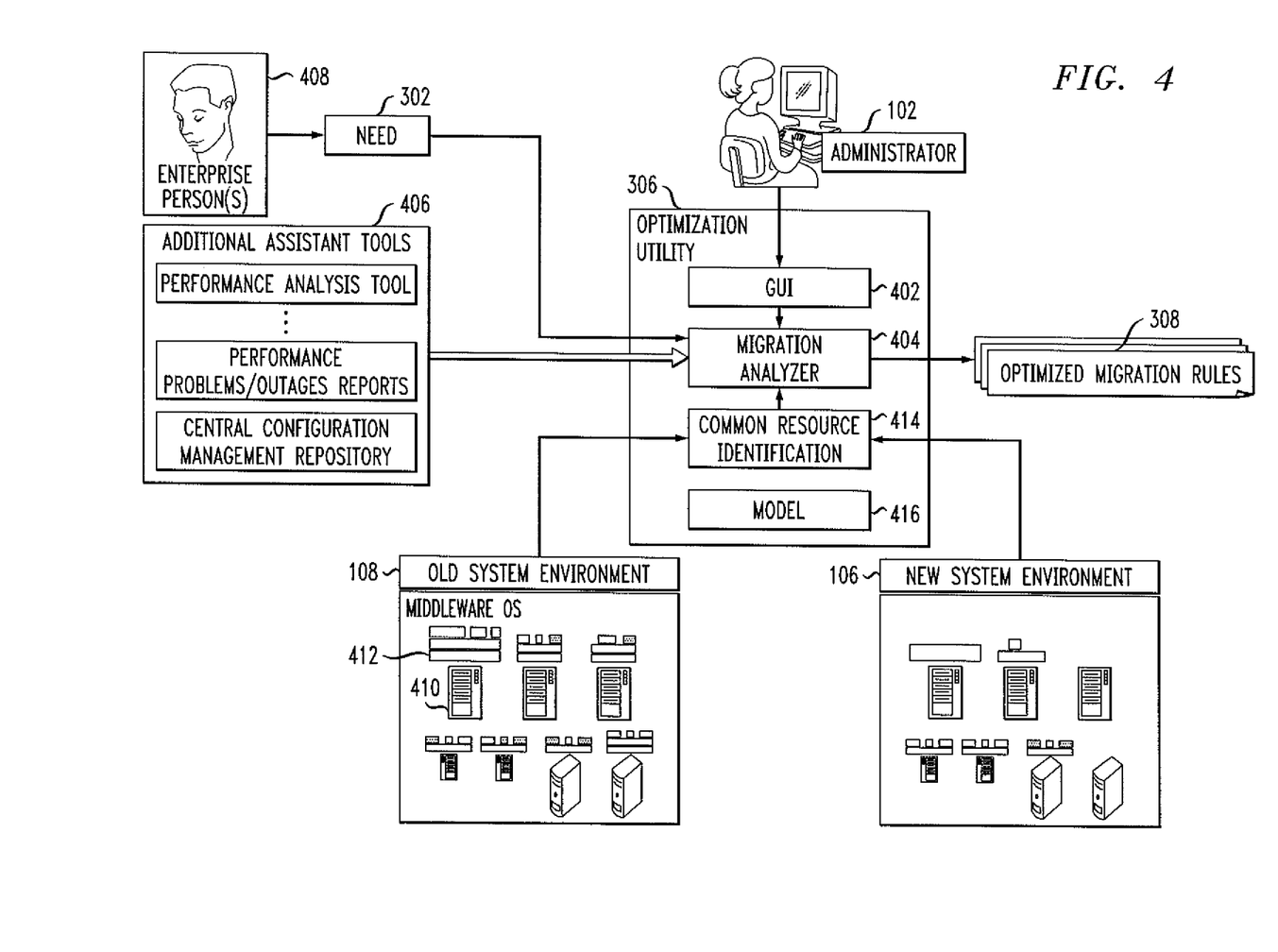
FIG. 4 illustrates an exemplary system for migration enhancement, according to another aspect of the invention.

One or more embodiments of the invention provide a method and apparatus for optimizing migration of software applications from an old (more generally source) system environment 108 to a new (more generally, target) system environment 106. This technique, as illustrated in FIG. 4, preferably involves implementing functionality in an executable utility 306 which will, upon command, compare the old and new system environments 108, 106 to identify common resources; analyze deployment and configuration of software applications, taking needs 302 into account; and generate enhanced or optimized migration rules 308 by reasoning to satisfy enterprise needs automatically and/or by being advised by administrator 102. Elements in FIG. 4 similar to the prior figures have received the same reference character. According to this exemplary embodiment, a migration utility (as discussed above) provides the deployment and configuration data needed from migration. By reading these data from the migration utility, optimization utility 306 will decide how to optimize the migration to satisfy needs 302, such as enterprise needs. For instance, the enterprise objective of the migration may be to substantially improve the reliability of a DB2 instance. After getting the deployment and configuration of this DB2 instance on the old system environment 108, (for example, it is deployed on one single server with a single DB2 instance configuration mode), the optimization utility will generate the optimized migration rules to change the DB2 deployment to provision it onto two servers in the new system environment 106, one as a basic server, and one as a backup server Meanwhile, the migration rules also change its single instance configuration to HADR (High Availability Disaster Recovery) configuration mode. The enterprise needs (also called enterprise objectives) can be defined in files that will be read by optimization utility 306, or can be the policies defined in the GUI 402 provided by the optimization utility 306.

In addition to satisfying enterprise needs, in some instances, the optimization utility can also identify the problem(s) of the existing system environment and generate an optimized configuration of software applications in the new system environment In some embodiments, enterprise needs, and one or more advisories from administrators based on their knowledge, are inputs of the optimization utility for generating optimized migration rules. Additionally, information from other assistant tools can be taken into account as input to the optimization utility as well. For instance, a performance monitoring and bottleneck analysis tool (see block 406) can be used to identify performance bottleneck(s) for software application(s). For example, it may show that the memory of a DB2 server is only 1 G, with high utilization for the server, so as to cause high GC (so-called "garbage collection") frequency, and correspondingly low performance of a J2EE application which accesses the DB2 server frequently ("Garbage collection" is the common name for "automatic memory management" wherein memory can be allocated and used, and the GC process will automatically free any chunks of memory no longer referred to.) Therefore, in some instances, the optimization utility will take these data from assistant tools as input for analysis and generate the optimized migration rules, that is, the J2EE application will be provisioned and configured to access a DB2 server with memory more than 1 G in the new system environment. Thus, even without clean-cut needs as the input, the optimization utility can still generate an optimized migration with optimal configuration of software applications in the new system environment.

By way of completeness, utility 306 can include model 416, as well as migration analyzer 404, which receives input 406 such as from additional assistant tools, performance analysis tools, performance problems/outages reports, a central configuration management repository, and the like. The needs 302 may be obtained, for example, from enterprise person(s) 408, that is, one or more individuals familiar with the needs of the enterprise or other entity to be served. The old and new system environments may each include, for example, hardware resources such as server 410 having a software stack 412 including an operating system (OS), middleware, and one or more applications. Common resource identification 414 takes into account the resources of old and new systems 108, 106.

It should be noted at this point that "enhancing" is intended to encompass improvements that may rise to the level of optimization, as well as lesser improvements, and mentions of optimization in the exemplary embodiments are also intended to encompass enhancement.

Figure 5:
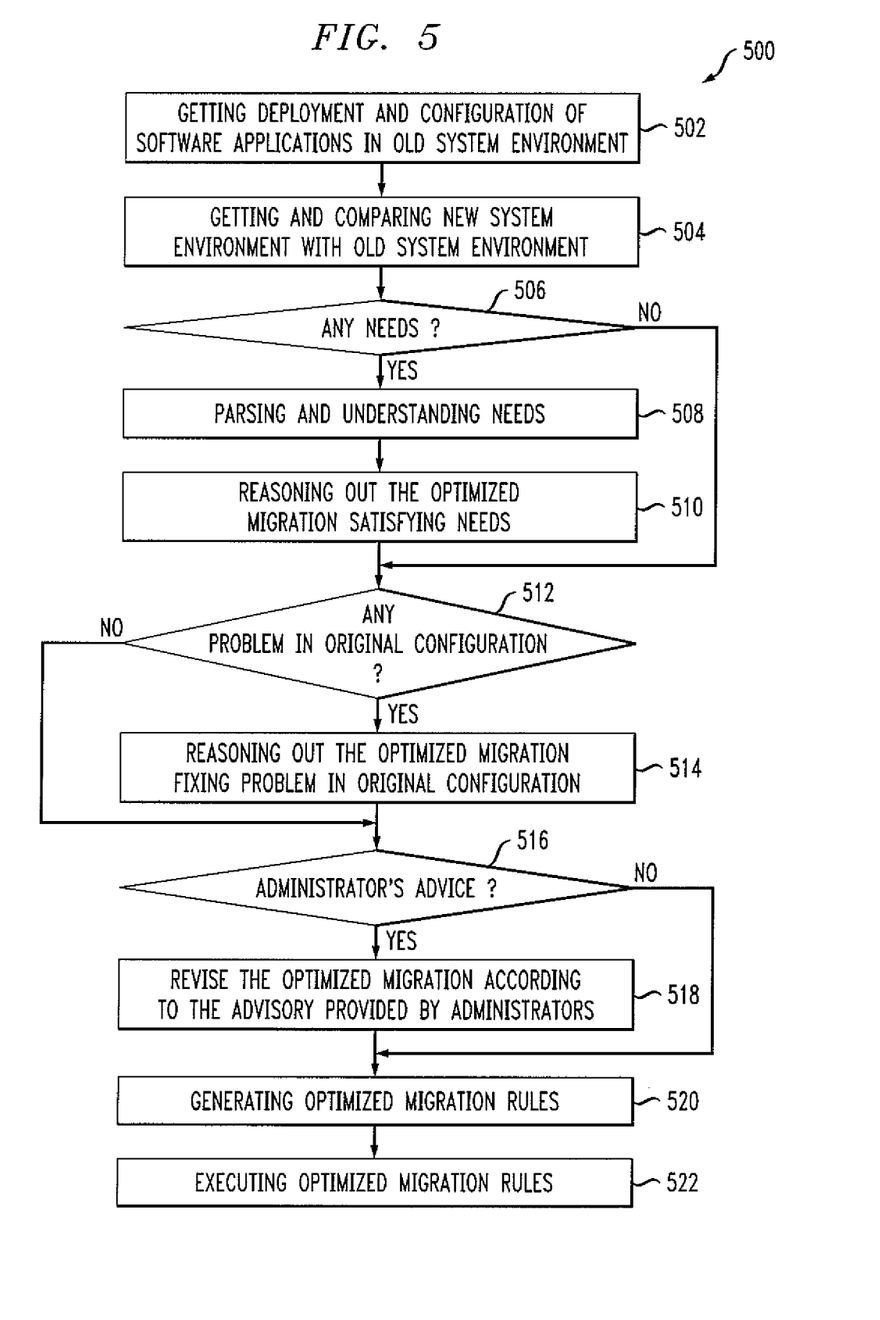
FIG. 5 illustrates a detailed process flow of migration enhancement, according to yet another aspect of the invention.

Attention should now be given to flow chart 500 of FIG. 5, which depicts detailed exemplary method steps in a method for enhancing migration of software applications from a source system environment to a destination system environment, according to an aspect of the invention. At block 502, deployment and configuration of software applications are obtained for the old system environment. At block 504, similar information is obtained for the new system environment and the two environments are compared. At decision block 506, a decision is made whether there are any needs, such as enterprise needs. If there are such needs, as per the "YES" branch of block 506, the need(s) are parsed and understood at block 508, and an optimized migration satisfying the needs is reasoned out at block 510.

Processing then proceeds to decision block 512, where a determination is made whether there were any problems in the initial configuration (the "NO" branch of block 506 proceeds directly to this point). If there were any problems, as pert the "YES" branch of block 512, such problems are fixed in connection with the optimized migration, as per block 514. At decision block 516, a decision is made whether the administrator's advice is to be obtained (the "NO" branch of block 512 proceeds directly to this point) If advice is to be obtained, as per the "YES" branch of block 516, the optimized migration is revised according to the advice, as per block 518. At block 520, optimized migration rules are generated. The generated rules may be provided for implementation, storage, and/or transmission. Block 522 depicts execution of the rules. The "NO" branch of block 516 proceeds directly to block 520. The enhanced migration rules can be executed, for example, by a migration utility 202. The migration utility apparatus 202 can be in charge of provisioning and setting configurations of software applications in the target system environment 106. As noted, in some instances, the enhanced migration rules are substantially optimized migration rules.

In general terms, the exemplary inventive method includes translating needs 302 into requirements for the destination system 106, and capturing deployment and configuration of the software applications in the source system environment 108 and the destination system environment 106 in a centralized model, such as model 416. Dependencies between the systems in the source and destination systems can be analyzed, to construct a mapping between the requirements and elements of the model, and the enhanced (optimized) rules are generated at 520, based in whole or in part on the mapping. That is, the generating of the enhanced migration rules can be performed, at least in part, based on the enhanced migration that has been developed.

In some instances, an editing user interface such as GUI 402 is provided to a user such as 102, to correct automatically-generated migration decisions of the enhanced migration rules The user interface can include, for example, a flagging provision for automatically flagging a subset of the decisions for further review.

With respect to identification of needs, it should be noted that the needs can be obtained and understood as at block 508, for example, by pal-sing input files, defining policies using a migration utility 202 (this can involve, e.g., defining via the GUI 402 provided by the migration utility). Another option for the obtaining and understanding of the needs includes obtaining messages sent by a separate apparatus.

Additional steps can include analyzing the deployment and configuration of the software applications in the source system environment, obtained at 502, to capture at least one of the following: (i) inter-dependency among the software applications, (ii) inter-dependency among configuration parameters of the software applications, and (iii) inter-dependency among: (iii-a) the software applications 110, and (iii-b) resources 410 provided by the source system environment 108. In one or more embodiments, these deployment and configuration data are provided by a separate apparatus which is in charge of capturing information from the old system environment and software applications, and storing such information into a central model 416.

Advantageously, the destination system environment 106 is compared with the source system environment 108 to identify at least (i) resources common to the source and destination system environments, as at 414, and (ii) different resources provided by the source and destination system environments. In one or more embodiments, the information pertaining to the old and new system environments is provided by a separate apparatus which is in charge of capturing information from the old and new system environments.

The development of the enhanced migration can be done, for example, according to the model 416, the obtaining and understanding of the needs at 508, the analyzing of the deployment and configuration of the software applications 110, and the comparison of the destination and source system environments 106, 108. In one or more embodiments, during the reasoning process, the administrator 102 can give some advice for optimizing migration based on his or her knowledge, as at blocks 516, 518, and some additional assistant tools 406 can also be used to reason out the optimized migration. In general, the reasoning process could be performed by humans and/or software tools and/or humans aided by a software tool.

Exemplary System and Article of Manufacture Details

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 6:
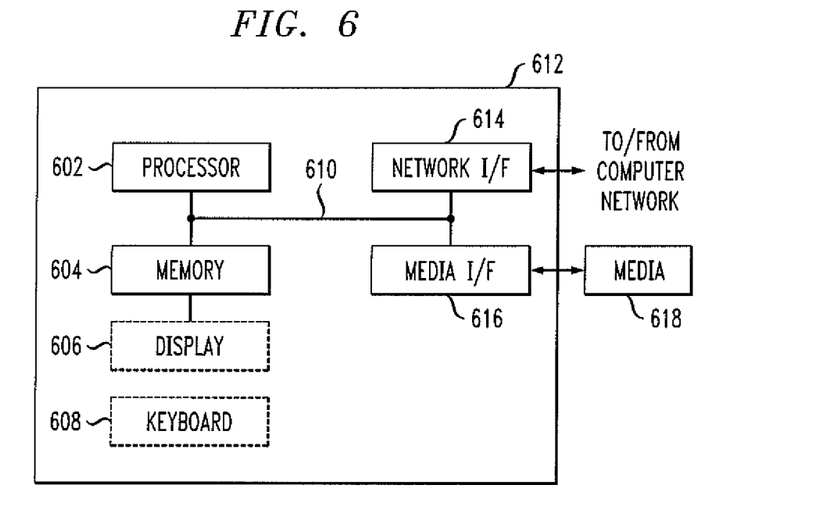
FIG. 6 depicts a computer system that may be useful in implementing one or more aspects and/or elements of the present invention.

One or more embodiments can make use of software running on a general purpose computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 618) providing program code for use by or in connection with a computer or any instruction execution system. For the purposes of this description, a computer usable or computer readable medium can be any apparatus for use by or in connection with the instruction execution system, apparatus, or device. The medium can store program code to execute one or more method steps set forth herein.

The medium can be an electronic, magnetic, optical, electromagnetic, infrared, or semiconductor system (or apparatus or device) or a propagation medium. Examples of a computer-readable medium include a semiconductor or solid-state memory (for example memory 604), magnetic tape, a removable computer diskette (fox example media 618), a random access memory (RAM), a read-only memory (ROM), a rigid magnetic disk and an optical disk Current examples of optical disks include compact disk-read only memory (CD-ROM), compact disk-read/write (CD-R/W) and DVD.

A data processing system suitable for storing and/or executing program code will include at least one processor 602 coupled directly or indirectly to memory elements 604 through a system bus 610. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards 608, displays 606, pointing devices, and the like) can be coupled to the system either directly (such as via bus 610) or through intervening I/O controllers (omitted for clarity).

Network adapter is such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for enhancing migration of software applications from a source system environment to a destination system environment, said method comprising the steps of:
    translating needs into one or more requirements for said destination system, wherein at least one of said one or more requirements is not satisfied by said source system environment as configured prior to execution of said method;
    capturing deployment and configuration of said software applications in said source system environment and said destination system environment in a centralized model;
    analyzing dependencies between said systems in said source and destination systems to construct a mapping between said requirements and elements of said model;
    generating one or more enhanced migration rules, based, at least in part, on said mapping, wherein said one or more enhanced migration rules define configuration parameters to configure said destination system to satisfy said one or more requirements not satisfied by said source system environment as configured prior to execution of said method;
    querying whether there is a problem with the source system environment; and
    if there is a problem with the source system environment, fixing the problem, wherein said one or more enhanced migration rules comprise optimized migration rules based, at least in part, on the problem in the source system environment.

2. The method of claim 1, further comprising the additional step of providing an editing user interface to a user, to correct automatically-generated migration decisions of said one or more enhanced migration rules.

3. The method of claim 2, wherein said user interface comprises a flagging provision for automatically flagging a subset of said decisions for further review.

4. The method of claim 1, further comprising the additional step of obtaining and understanding said needs.

5. The method of claim 4, wherein said obtaining and understanding of said needs comprises parsing input files.

6. The method of claim 4, wherein said obtaining and understanding of said needs comprises defining policies using a migration utility.

7. The method of claim 4, wherein said obtaining and understanding of said needs comprises obtaining messages sent by a separate apparatus.

8. The method of claim 4, further comprising the additional steps of analyzing said deployment and configuration of said software applications in said source system environment to capture at least one of the following:
- inter-dependency among said software applications;
- inter-dependency among configuration parameters of said software applications; and
- inter-dependency among: (i) said software applications, and (ii) resources provided by said source system environment.

9. The method of claim 8, further comprising the additional step of comparing said destination system environment with said source system environment to identify at least (i) resources common to said source and destination system environments, and (ii) different resources provided by said source and destination system environments.

10. The method of claim 9, further comprising the additional step of developing an enhanced migration according to:
- said model;
- said obtaining and understanding of said needs;
- said analyzing of said deployment and configuration of said software applications; and
- said comparison of said destination and source system environments.

11. The method of claim 10, wherein said generating of said one or more enhanced migration rules is performed, at least in part, based on said step of developing said enhanced migration.

12. The method of claim 11, further comprising the additional step of executing said one or more enhanced migration rules.

13. The method of claim 12, wherein said one or more enhanced migration rules are executed by a migration utility.

14. A computer program product comprising a tangible computer useable readable recordable storage medium including computer usable program code for enhancing migration of software applications from a source system environment to a destination system environment, said computer program product including:
- computer usable program code for translating needs into one or more requirements for said destination system, wherein at least one of said one or more requirements is not satisfied by said source system environment as configured prior to execution of said method;
- computer usable program code for capturing deployment and configuration of said software applications in said source system environment and said destination system environment in a centralized model;
- computer usable program code for analyzing dependencies between said systems in said source and destination systems to construct a mapping between said requirements and elements of said model;
- computer usable program code for generating one or more enhanced migration rules, based, at least in part, on said mapping, wherein said one or more enhanced migration rules define configuration parameters to configure said destination system to satisfy said one or more requirements not satisfied by said source system environment as configured prior to execution of said method;
- querying whether there is a problem with the source system environment; and
- if there is a problem with the source system environment, fixing the problem, wherein said one or more enhanced migration rules comprise optimized migration rules based, at least in part, on the problem in the source system environment.

15. The computer program product of claim 14, further comprising computer usable program code for obtaining and understanding said needs.

16. The computer program product of claim 14, further comprising computer usable program code for analyzing said deployment and configuration of said software applications in said source system environment to capture at least one of the following:
- inter-dependency among said software applications;
- inter-dependency among configuration parameters of said software applications; and
- inter-dependency among: (i) said software applications, and (ii) resources provided by said source system environment.

17. An apparatus for enhancing migration of software applications from a source system environment to a destination system environment, the apparatus comprising:
- a memory; and
- at least one processor, coupled to the memory, operative to:
  - translate needs into one or more requirements for said destination system, wherein at least one of said one or more requirements is not satisfied by said source system environment as configured prior to execution of said method;
  - capture deployment and configuration of said software applications in said source system environment and said destination system environment in a centralized model;
  - analyze dependencies between said systems in said source and destination systems to construct a mapping between said requirements and elements of said model;
  - generate one or more enhanced migration rules, based, at least in part, on said mapping, wherein said one or more enhanced migration rules define configuration parameters to configure said destination system to satisfy said one or more requirements not satisfied by said source system environment as configured prior to execution of said method;
- querying whether there is a problem with the source system environment; and
- if there is a problem with the source system environment, fixing the problem, wherein said one or more enhanced migration rules comprise optimized migration rules based, at least in part, on the problem in the source system environment.

18. The apparatus of claim 17, wherein said processor is further operative to obtain and understand said needs.

19. The apparatus of claim 17, wherein said processor is further operative to analyze said deployment and configuration of said software applications in said source system environment to capture at least one of the following:
- inter-dependency among said software applications;
- inter-dependency among configuration parameters of said software applications; and
- inter-dependency among: (i) said software applications, and (ii) resources provided by said source system environment.

* * * * *